United States Patent [19]
Ackley

[11] Patent Number: 5,890,817
[45] Date of Patent: *Apr. 6, 1999

[54] U.P.C./EAN SYMOLOGY FONT OPTIMIZATION IN AN ON-DEMAND PRINTER

[75] Inventor: H. Sprague Ackley, Seattle, Wash.

[73] Assignee: Intermec Corporation, Everett, Wash.

[*] Notice: The term of this patent shall not extend beyond the expiration date of Pat. No. 5,681,120.

[21] Appl. No.: 859,558

[22] Filed: May 20, 1997

Related U.S. Application Data

[63] Continuation of Ser. No. 518,423, Aug. 23, 1995, Pat. No. 5,681,120.

[51] Int. Cl.⁶ .................................................. B41J 2/00
[52] U.S. Cl. .......................................... 400/103; 400/104
[58] Field of Search ............................... 400/68, 103, 104

[56] References Cited

U.S. PATENT DOCUMENTS

| | | | |
|---|---|---|---|
| 3,975,707 | 8/1976 | Ito et al. ................................ 346/76 R |
| 4,567,488 | 1/1986 | Moriguchi et al. ................. 346/76 PH |
| 4,661,001 | 4/1987 | Takai et al. ............................... 400/103 |
| 4,795,281 | 1/1989 | Ulinski ....................................... 400/74 |
| 4,824,266 | 4/1989 | Fujii et al. ............................... 400/120 |
| 4,864,112 | 9/1989 | Imai et al. ............................... 400/103 |
| 4,870,428 | 9/1989 | Kuwabara et al. ................. 346/76 PH |
| 4,937,590 | 6/1990 | Robillard et al. ................... 346/76 PH |
| 5,007,748 | 4/1991 | Lee et al. ................................ 400/103 |
| 5,023,437 | 6/1991 | Speicher ................................. 400/103 |
| 5,056,429 | 10/1991 | Hirosaki ................................ 400/103 |
| 5,183,343 | 2/1993 | Tazawa et al. ......................... 400/103 |
| 5,564,841 | 10/1996 | Austin et al. .......................... 400/103 |
| 5,681,120 | 10/1997 | Ackley .................................... 400/103 |

FOREIGN PATENT DOCUMENTS

| | | |
|---|---|---|
| 0 329 369 A2 | 8/1989 | European Pat. Off. . |
| 60-73852 | 4/1985 | Japan . |
| 61-22960 | 1/1986 | Japan . |
| 2 228 450 | 8/1990 | United Kingdom . |

OTHER PUBLICATIONS

Bassetti, L. W. and S. Kantor, "Print Enhancement for Laser Printers," *IBM Technical Disclosure Bulletin 27:5*, Oct., 1984, pp. 3071–3072.

"Table of Contents," *IBM Technical Disclosure Bulletin 27:5*, Oct., 1984, pp. i–xvi.

*Primary Examiner*—John Hilten
*Attorney, Agent, or Firm*—Seed & Berry LLP

[57] ABSTRACT

A method of printing a pre-defined symbology character set as a series of bars separated by spaces in which the bars are formed of horizontal rows of close adjacent dots while preventing ambiguous decoding of similar character pairs in which one character employs wide bars and one character employs narrow bars. The method comprises the steps of, subtracting at least a portion of one dot or more per horizontal row from bars of similar characters employing narrow bars; and, adding at least a portion of one dot or more per horizontal row to bars of similar characters employing wide bars. It is particularly useful in printing U.P.C./EAN symbology with a low-cost demand printer employing thermal printing techniques.

22 Claims, 7 Drawing Sheets

U.P.C./EAN SYMOLOGY FONT OPTIMIZATION IN AN ON-DEMAND PRINTER

CROSS-REFERENCE TO RELATED APPLICATION

This application is a continuation of U.S. patent application Ser. No. 08/518,423, filed Aug. 23, 1995, now U.S. Pat. No. 5,681,120.

BACKGROUND OF THE INVENTION

1. Technical Field

This invention relates to on-demand printers printing U.P.C./EAN bar-codes and, more particularly, to a method and associated apparatus for printing a pre-defined symbology character set as a series of bars separated by spaces in which the bars are formed of horizontal rows of close adjacent dots while preventing ambiguous decoding of similar character pairs in which one character employs wide bars and one character employs narrow bars in which the method comprises the steps of, subtracting at least a portion of one dot or more per horizontal row from bars of similar characters employing narrow bars; and, adding at least a portion of one dot or more per horizontal row to bars of similar characters employing wide bars.

2. Background Art

Figure 1:
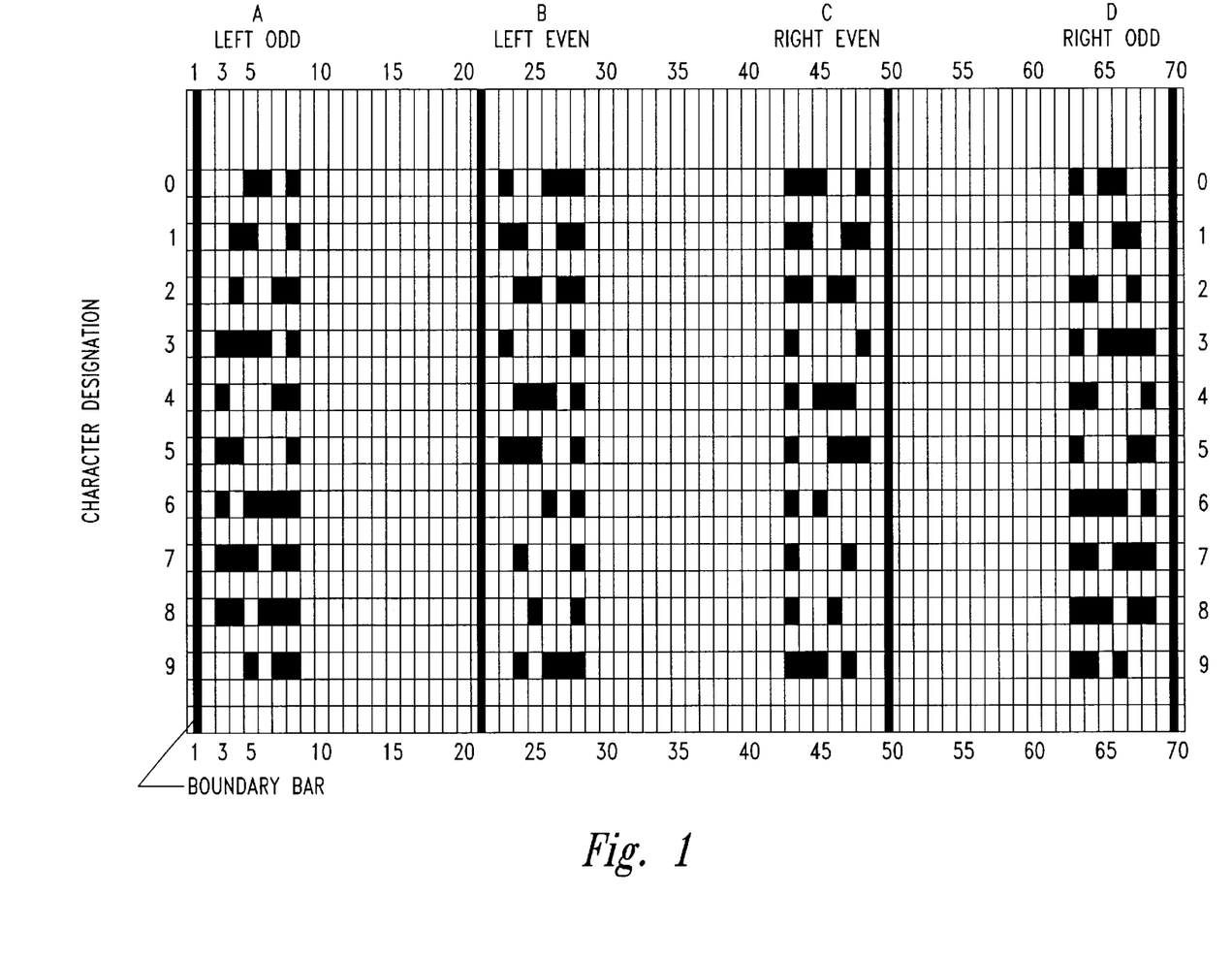
FIG. 1 is a drawing showing the U.P.C./EAN symbology character set.

U.P.C./EAN symbology is employed in marking products found in supermarkets and the like which are scanned by an optical reader connected to a pricing and inventory computer system. While for the most part a fault-tolerant system in which it is virtually impossible for a label to be misread as a valid identification number for another product, there is one big problem with the U.P.C./EAN symbology—ambiguity with the decode of the 1 & 7 and the 2 & 8 symbol characters. The problem can be understood from the U.P.C./EAN symbology character set as depicted in FIG. 1 taken with FIG. 2, which depicts the 1 and 7 characters. Due to the manner in which the characters are decoded, unless there is a clear distinction as to the bar sizes and spacing, both characters can be decoded as a "T=4,4" character. To achieve a scanable distinction between the 1, 2, 7, and 8 characters, these characters typically have slightly different dimensions by about 8% from the other characters (i.e. 0, 3, 4, 5, 6, and 9). The original specification required that film master based symbols, capable of resolution in excess of 10,000 dots per inch (dpi), precisely add the printing compensation required.

Original tolerances precluded any matrix demand printing platform printing U.P.C./EAN symbology from performing the correction. Consequently, the print quality measurements for these symbols always lagged web symbols. The newly published specification (September 1994) allows for a new method of measurement which includes this correction; but, it has been assumed to be impossible to successfully implement it on demand platforms. It turns out that the new method, called "decodability", does not penalize print quality measurements for slight over-compensation of the ambiguous correction. Therefore, high resolution printing platforms, such as thermal demand printers with resolution on the order of 300 dpi or more, are capable of printing higher quality symbols with the adjusted font than any printing platform currently on the market or described in the art. What is needed is a way to use the new specification to advantage without having to procure expensive media or print at slow speeds to insure a high enough print quality that still passes specification after the decodability penalty is assessed.

Solving this problem in demand printers is not new in and of itself. The first demand printers for U.P.C. symbology had 10,000 dpi resolution elements (the same as film master based symbols) and, therefore, were able to print on demand with the same quality and resolution. One such printer was the model 8312 manufactured by Interface Mechanisms, Inc. (now known as Intermec, Inc., the assignee of the present invention). No other demand printing process has ever been able to print in-specification U.P.C./EAN symbols and have resorted to printing higher than necessary quality symbols to compensate and, hence, carried a higher cost.

The principal disadvantages of prior art approaches to solving this problem in on-demand printers are the higher cost and slower speed. Most demand processes are extremely cost sensitive and frequently borderline symbols are produced which, consequently, pass all parameters except decodability. Retail systems for reading and processing U.P.C./EAN symbols often keep accurate records of how many symbols are misread and how many codes must be hand keyed in by employees as a result of a failure to successfully read the symbols. The data are associated with the vendors who supplied the products. And, vendors have been subject to fines of up to $5,000 per infraction for supplying products with U.P.C./EAN symbols which are not decodable. Thus, in many cases, vendors have been forced to resort to expensive pre-printing processes in order to avoid the lack of quality of demand printing platforms.

Wherefore, it is an object of the present invention to provide an on-demand printer in which U.P.C./EAN symbols can be printed the same way as any other bar code symbology font and achieve the same performance levels.

It is another object of the present invention to provide an on-demand printer in which U.P.C./EAN symbols can be printed with low-cost consumables, higher throughput, and a lower likelihood of penalty fines.

Other objects and benefits of this invention will become apparent from the description which follows hereinafter when read in conjunction with the drawing figures which accompany it.

SUMMARY

The foregoing objects have been achieved in a demand printer printing a pre-defined U.P.C./EAN symbology character set having "left odd", "left even", "right even", and "right odd" versions as a series of bars separated by spaces in which the bars are formed of horizontal rows of close adjacent dots by logic designating dots to be printed in the horizontal rows of the bars of the characters, by the improvement to prevent ambiguous decoding of "1", "2", "7", and "8" characters printed by the printer of the present invention comprising the logic including adjusting logic which adjusts the pre-defined U.P.C./EAN symbology character set for the "1", "2", "7", and "8" characters by, subtracting at least a portion of one dot or more per horizontal row from bars of left odd and right odd "1" and "2" characters and of left even and right even "7" and "8" characters; and, adding at least a portion of one dot or more per horizontal row to bars of left even and right even "1" and "2" characters and to left odd and right odd "7" and "8" characters.

The pre-defined U.P.C./EAN symbology character set can also be pre-modified in the same manner prior to printing.

In its broadest approach, the present invention is a method of printing a pre-defined symbology character set as a series of bars separated by spaces in which the bars are formed of horizontal rows of close adjacent dots while preventing ambiguous decoding of similar character pairs in which one character employs wide bars and one character employs narrow bars by subtracting at least a portion of one dot or more per horizontal row from bars of similar characters employing narrow bars and adding at least a portion of one dot or more per horizontal row to bars of similar characters employing wide bars so that the distinction between the wide bars and the narrow bars is more discernible to the optical scanning apparatus and decoding logic employed.

DESCRIPTION OF THE PREFERRED EMBODIMENT

The implementation of the correction factor in a standard on-demand printer according to the present invention is straight forward and can be done on any base font, such as that of FIG. 1, having the problem addressed with particularity herein. FIG. 1 is a complete diagram of the twenty (7,2) character set which makes up the U.P.C. Version A (left odd and right even) and Version E (left odd and left even) symbols as well as the EAN-13 (left odd, left even, and right even) and EAN-8 (left odd and right even) symbols. Additionally, the right odd characters are included since Version D requires all four character types.

Table A designates the correction to be applied when printing the characters of FIG. 1 in order to achieve the objectives of the present invention according to one possible implementation thereof. The adjustment of "plus one dot or more" (+) and "minus one dot or more" (−) applies to each bar with the corresponding space decreased or increased, respectively, by one dot or more for printing resolutions of approximately 200 dpi or more.

TABLE A

| CHARACTER | LEFT ODD | LEFT EVEN | RIGHT EVEN | RIGHT ODD |
| --- | --- | --- | --- | --- |
| 0 | 0 | 0 | 0 | 0 |
| 1 | − | + | + | − |
| 2 | − | + | + | − |
| 3 | 0 | 0 | 0 | 0 |
| 4 | 0 | 0 | 0 | 0 |
| 5 | 0 | 0 | 0 | 0 |
| 6 | 0 | 0 | 0 | 0 |
| 7 | + | − | − | + |
| 8 | + | − | − | + |
| 9 | 0 | 0 | 0 | 0 |

Figure 2:
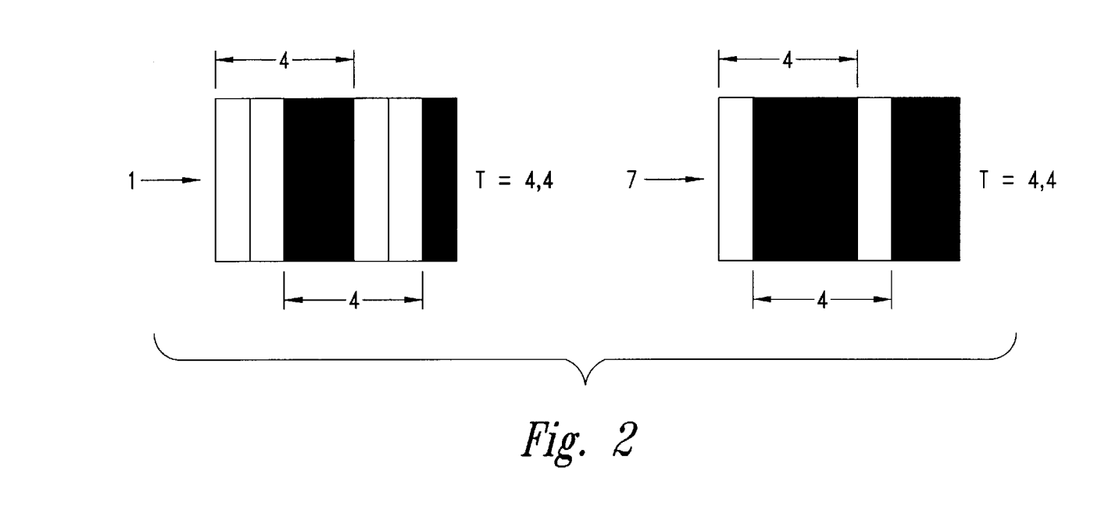
FIG. 2 depicts how the 1 and 7 characters can be misread.
Figure 3:
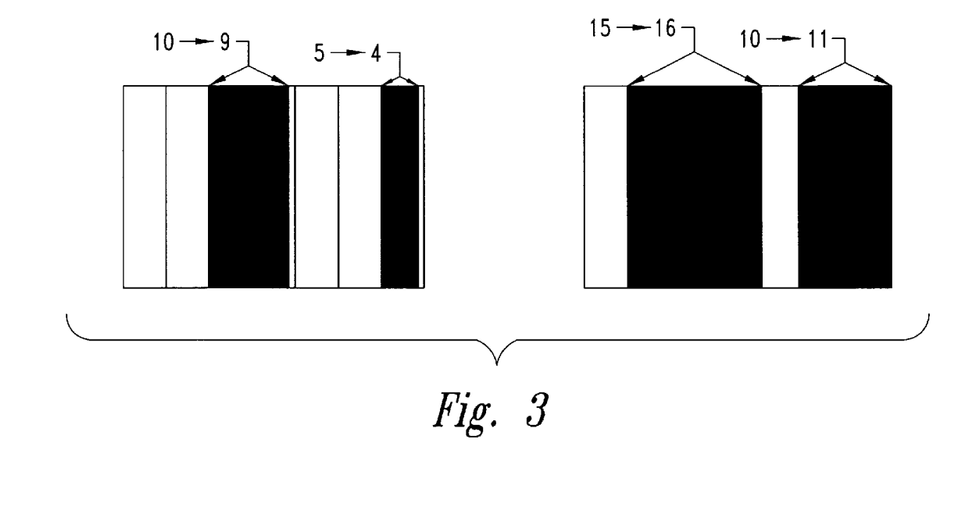
FIG. 3 depicts how the 1 and 7 characters are adjusted according to the present invention.

The drawing of FIG. 3 shows how this is applied to the "left odd" 1 and 7 characters of FIG. 2. Assuming a typical situation of five horizontal dots in each dot row for each bar position, Table A designates that the bars of the "1" character are to lose one dot or more per bar and the bars of the "7" character are to gain one dot or more per bar. Note that the adjustment is "per bar" and not per bar position. It will be seen that the "bars" of the U.P.C./EAN symbology employ one, two, three, and four bar positions. In the example of FIG. 3, each bar position is made up of five dots. Thus, with respect to the "1" character on the left side of FIG. 3, the bar comprising one bar position goes from five dots to four dots and the bar comprising two bar positions goes from ten dots to nine dots. Similarly with respect to the "7" character on the right side of FIG. 3 the bar having two bar positions goes from ten dots to eleven dots while the bar having three bar positions goes from fifteen dots to sixteen dots. The spaces between bars have a corresponding reduction or increase in the number of dot positions.

Figure 4:
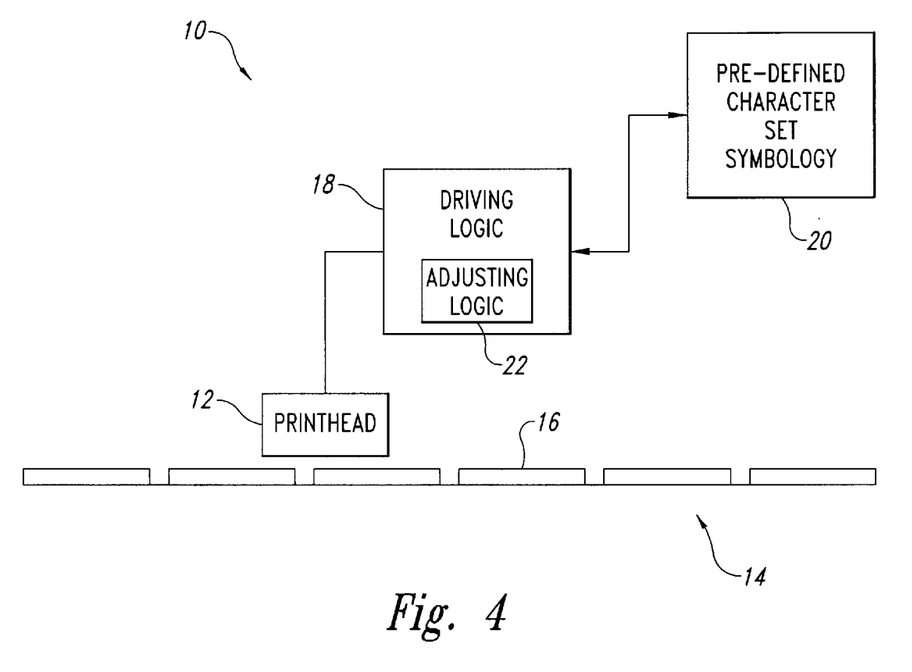
FIG. 4 is a simplified drawing of a printer according to the present invention.

One manner in which the present invention can be implemented is depicted in simplified form in FIG. 4. The printer 10 has a printhead 12 positioned above a moving media 14 having labels 16 thereon. The printhead 12 is driven by the driving logic 18. The driving logic 18 obtains the definition of the characters to print from the pre-defined character set symbology 20. In this embodiment of the present invention, the driving logic 18 includes adjusting logic 22 which dynamically adjusts the character set in the manner defined above. Thus, if a new character set were to be installed having similar problems, the adjusting logic 22 could compensate dynamically at print time. An alternate approach to the present invention would be to pre-adjust the pre-defined character set symbology 20 according to the techniques described in detail above. In that case, however, the pre-defined character set symbology 20 would have to be re-adjusted if a new character set were to be printed by the printer 10.

Figure 5:
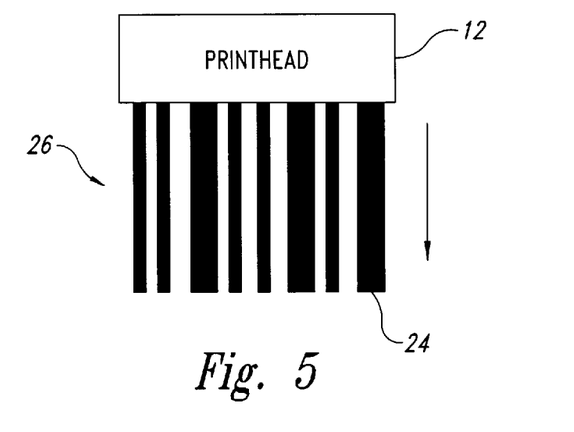
FIG. 5 is a simplified drawing of a label printer printing in a "drag" mode.
Figure 6:
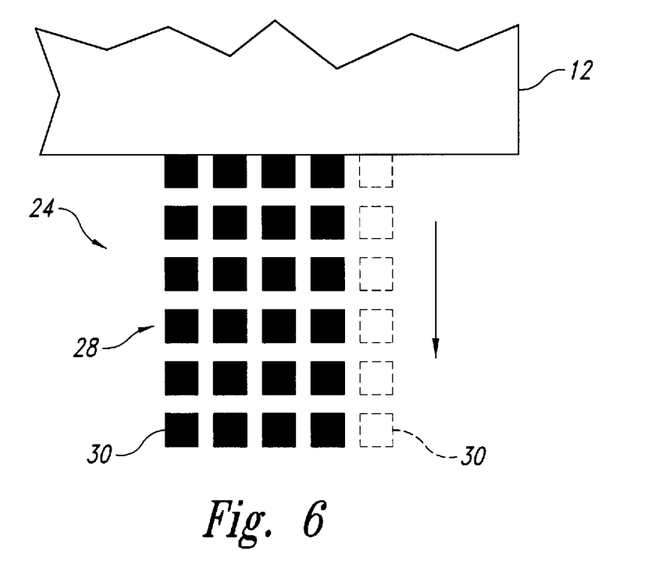
FIG. 6 is a simplified greatly enlarged drawing of a printhead printing a bar in the manner of FIG. 5 and depicting how the present invention is implemented in the drag mode.

Having thus looked at one implementation of the present invention broadly, let us now look at alternative ways in which the present invention can be implemented through the use of specialized printing apparatus and driving logic. A barcode printer printing barcodes as a series of dots prints in one of two modes—drag mode or picket fence mode. In the drag mode depicted in FIGS. 5 and 6, the printhead 12 prints the bars 24 of a barcode 26 simultaneously by printing each row 28 of dots 30 for all the bars 24 at the same time. Thus, each dot position is "dragged" along the length of its associated bar 24. In the drag mode, the present invention can be implemented only by adding or subtracting at least one dot or more 24 from all rows 28 of a bar 24. Each barcode is pre-defined. Thus, for example, the pre-defined character set symbology 20 of FIG. 4 would pre-define the U.P.C./EAN symbology character set for the "1", "2", "7", and "8" characters with the changes of the present invention pre-defined.

Figure 7:
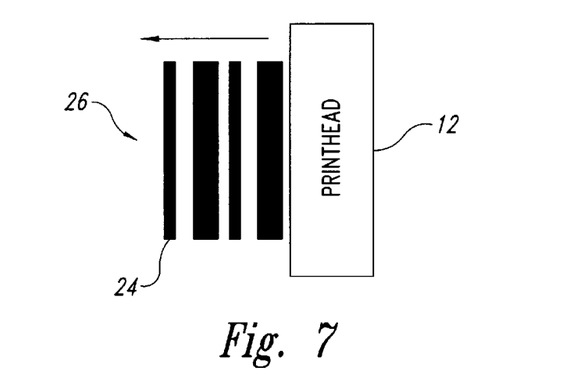
FIG. 7 is a simplified drawing of a label printer printing in a "picket fence" mode.
Figure 8:
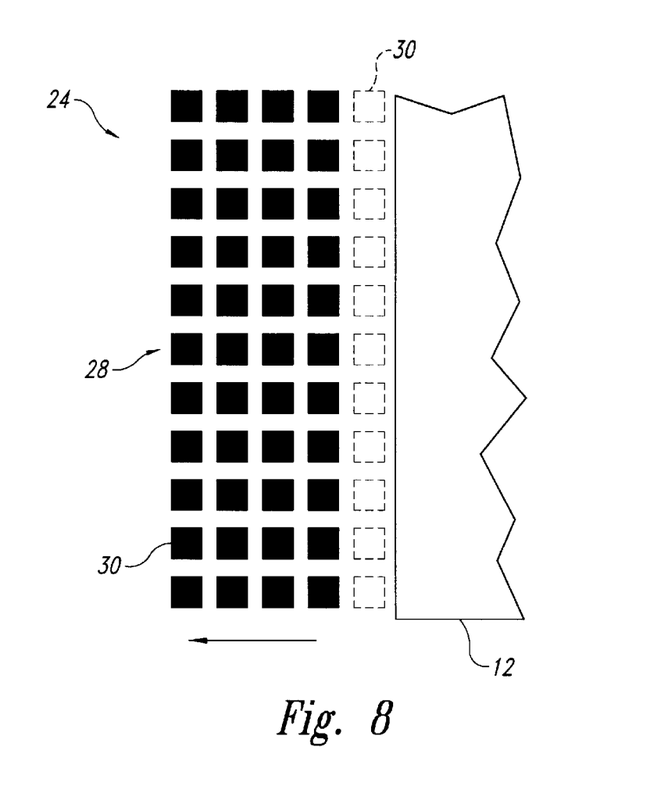
FIG. 8 is a simplified greatly enlarged drawing of a printhead printing a bar in the manner of FIG. 7 and depicting one way in which the present invention can be implemented in the picket fence mode.
Figure 9:
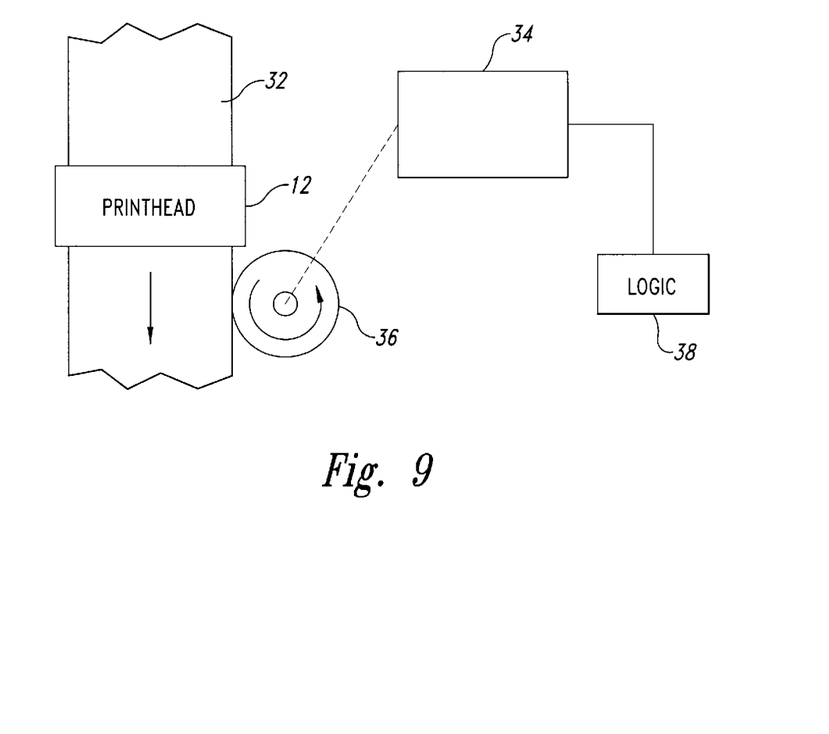
FIG. 9 is a simplified drawing of a mechanism used in a label printer to step the media between dot positions in the picket fence mode according to the present invention.
Figure 10:
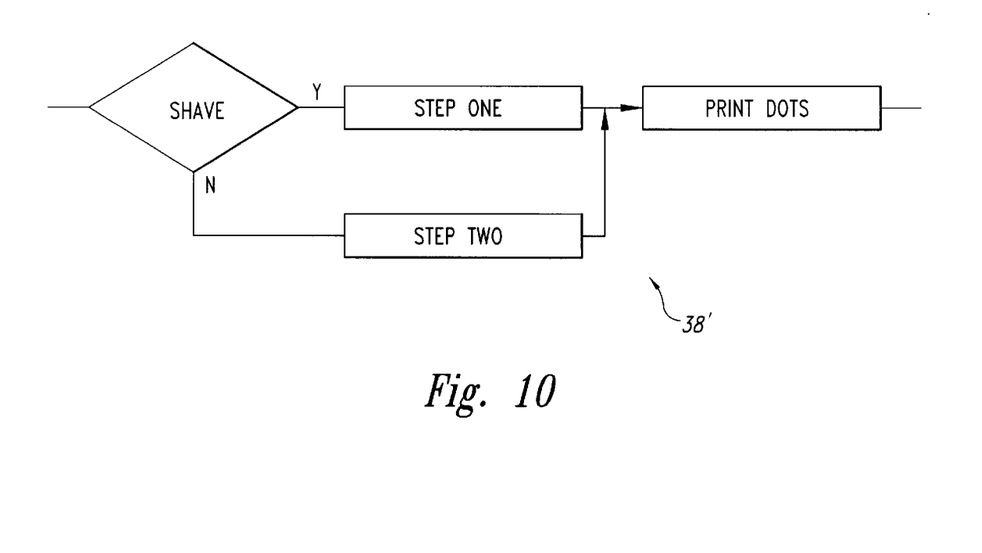
FIG. 10 is a simplified logic flow diagram for implementing the present invention in a second way in the picket fence mode employing the drive system of FIG. 9.
Figure 11:
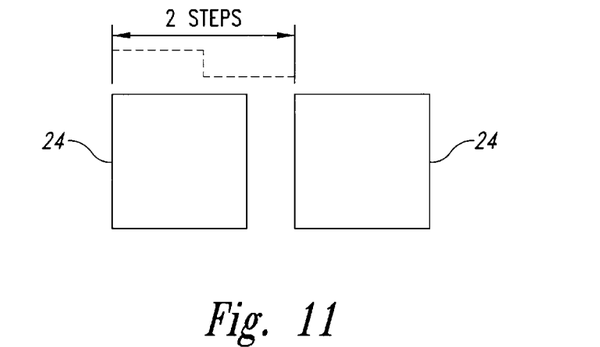
FIG. 11 is a greatly enlarged and simplified drawing of two adjacent dots depicting how there are at least two steps of the stepping motor employed to move the media between dot printing positions in the usual manner of printing in the picket fence mode.
Figure 12:
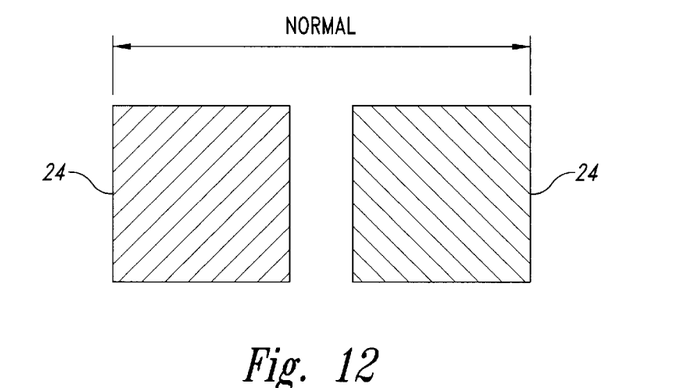
FIG. 12 is a greatly enlarged and simplified drawing of two adjacent dots depicting the outside width thereof when they are printed normally in the picket fence mode.
Figure 13:
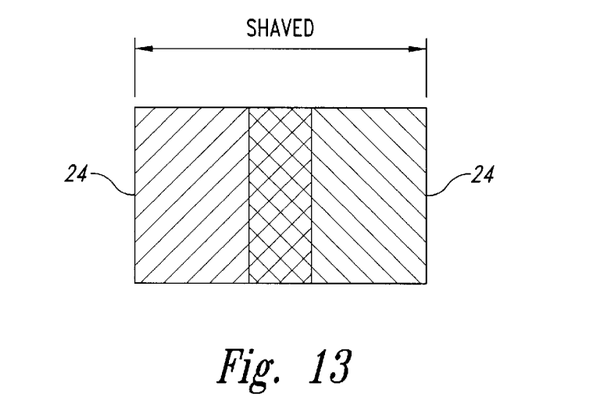
FIG. 13 is a greatly enlarged and simplified drawing of two adjacent dots depicting the outside width thereof when they are shave printed in the picket fence mode according to the present invention.

A more common printing approach is the "picket fence" printing technique of FIG. 7. Each vertical column of dots 24 for a vertical bar 24 is printed simultaneously. That is, one vertical column of dots 24 for all rows 28 in the bar 24 are printed simultaneously. Thus, the barcode 26 is printed from end to end rather than from top to bottom (or bottom to top) as was the case with the drag mode. The picket fence approach offers several ways of implementing the present invention which are not available in the drag mode. One could, of course, implement the present invention by adding or subtracting a whole column (or more) of dots 24 as depicted in FIG. 8. This could be done by pre-defining the U.P.C./EAN symbology character set with the "1", "2", "7", and "8" characters having the changes of the present invention pre-defined in total. It could also be done by defining "normal" bars and "special" bars modified according to the present invention and then defining the U.P.C./EAN symbology character set according to the bars employed with the "1", "2", "7", and "8" characters employing the special bars.

Where a drive system such as that depicted in FIG. 9 is employed in the label printer, other possible implementations of the present invention in the picket fence more are made possible. This is more fully described in a co-pending application by the inventor herein entitled DOT PRINTERS WITH WIDTH COMPRESSION CAPABILITIES filed on even date herewith as Ser. No. 08/518,226 filed Aug. 23, 1995 and assigned to the common assignee of this application, the teachings of which are incorporated herein by reference. The media 32 upon which the printing is to take place is moved in steps by a stepping motor 34 driving a drive roller 36, or the like, operably connected to move the media 32. The stepping motor 34 is driven by logic 38. Typically, there are two steps of the stepping motor 34 between print position of adjacent dots 24 as depicted in FIG. 11. If more steps are employed, the method to be described can be employed by simply modifying the number of steps in the manner taught hereinafter. By employing the logic 38' of FIG. 10 in the logic 38 of FIG. 9, "normal" and "shaved" bars of different width as depicted in FIGS. 12 and 13 can be produced. To produce a "normal" bar. All the dots 24 in each row 28 are spaced by two steps of the stepping motor 34 as depicted in FIG. 12. To produce a "shaved" bar, on the other hand, at least the last row 28 is spaced by only one step of the stepping motor 34 as depicted in FIG. 13. Thus, as can be appreciated by comparing FIGS. 12 and 13, the overall width of a bar 24 can be reduced by a portion of a dot (rather than a full dot) by printing the last dot at one step distance instead of two. Similarly, the same comparison will show that the overall width of a bar 24 can be increased by a portion of a dot by printing an extra row of dots at one step distance instead of two. This technique of bar width modification could have particular applicability in lower resolution printers employing say 200 dpi where the removal or addition of a full dot from or to the width of barcode bars being printed could adversely affect the print decodeability quality while a partial dot modification would actually improve the decodeability quality.

In a co-pending application entitled BAR SHAVING OF THE RESIDENT FONTS IN A THERMAL-PRINTING ON-DEMAND BARCODE PRINTER, Ser. No. 08/513,503, filed Aug. 23, 1995 by the inventor herein and assigned to the common assignee of this invention, a method of "shaving" dots from the bars of barcodes printed by thermal printers to increase readability by optical scanning apparatus is disclosed and claimed. It should be noted with particularity that the techniques of that application are not applicable to solving the problem solved by this invention. Any generic bar shaving that is applied on a symbology-wide basis according to that invention would be in addition to the character font adjustments of the present invention.

It should also be noted that the adjustment of the present invention includes both dot removal and dot addition. In actual tests of the present invention it was found that contrary to the common belief that the addition of dots to the bars would cause problems with the adjacent spaces (which are correspondingly reduced in width thereby), there was actually a benefit and an increase in accuracy of optical scanability and decoding which has been included as part of the best mode contemplated for the present invention.

Wherefore, having thus described the present invention, what is claimed is:

1. A method of printing a symbol in a pre-defined symbology character set, the symbol being formed from a group of characters, each character being represented by a plurality of dark regions and light regions, each of the dark regions having a respective standard width, wherein selected pairs of the characters have an ambiguous decode upon edge-to-edge decoding and others of the characters have an unambiguous decode upon edge-to-edge decoding, and wherein the ambiguous decoding can be resolved by evaluating a cumulative width of the dark regions, the method comprising the steps of:

segmenting the symbol into a plurality of rows of dots, each row forming a portion of each of a plurality of the characters;

determining nominal numbers of dots for each of the dark regions corresponding to the standard widths of the dark regions; and for each row, printing a plurality portions of the dark regions by:

narrowing at least one of the dark regions of a first one of the characters having the ambiguous decode by eliminating at least a portion of a dot from the respective nominal numbers of dots to produce a reduced number of dots;

maintaining unchanged the dark regions of one of the characters having the unambiguous decode; and printing the narrowed dark regions and the unchanged dark regions within the symbol by printing the reduced number of dots and the nominal number of dots, respectively.

2. The method of claim 1 further comprising the step of, for each number of dots, specifying a binary bit for each dot, the binary bit having a first state corresponding to the printing of the dot and a second state corresponding to the non-printing of the dot, wherein the step of narrowing at least one of the dark regions of a first one of the characters having the ambiguous decode by eliminating at least a portion of a dot from the respective nominal numbers of dots to produce a reduced number of dots includes the step of changing the state of at least one of the binary bits from the first state to the second state.

3. The method of claim 1 wherein the character symbol set is an EAN/UPC designated set.

4. The method of claim 3 wherein the characters having the ambiguous decode include the "1", "2", "7", and "8" characters.

5. The method of claim 3 wherein the characters having the ambiguous decode include the "1", "2", "7", and "8" characters and wherein the step of narrowing at least one of the dark regions of a first one of the characters having the ambiguous decode by eliminating at least a portion of a dot from the respective nominal numbers of dots to produce a reduced number of dots includes eliminating at least a portion of one dot from dark regions of left odd or right odd "1" and "2" characters or of left even or right even "7" and "8" characters.

6. The method of claim 1 further comprising the steps of:
widening at least one of the dark regions of a second one of the characters having the ambiguous decode by adding at least a portion of a dot to the respective nominal numbers of dots to produce an increased number of dots; and
printing the widened dark regions by printing the increased number of dots.

7. The method of claim 6 wherein the characters having the ambiguous decode include the "1", "2", "7", and "8" characters and wherein the step of widening at least one of the dark regions of a second one of the characters having the ambiguous decode by adding at least a portion of a dot to the respective nominal numbers of dots to produce an increased number of dots includes the step of adding at least a portion of one dot to dark regions of left even or right even "1" and "2" characters or to left odd or right odd "7" and "8" characters.

8. A method of printing a symbol in a pre-defined symbology character set, the symbol being formed from a group of characters, each character being represented by a plurality of dark regions and light regions, each of the dark regions having a respective standard width, wherein selected ones of the characters have an ambiguous decode upon edge-to-edge decoding and others of the characters have an unambiguous decode upon edge-to-edge decoding, and wherein the ambiguous decoding can be resolved by evaluating a cumulative width of the dark regions, the method comprising the steps of:
segmenting the symbol into a plurality of rows of dots, each row forming a portion of each of a plurality of the characters;
determining nominal numbers of dots for each of the dark regions corresponding to the standard widths of the dark regions; and
for each row, printing a plurality portions of the dark regions by:
widening at least one of the dark regions of a first one of the characters having the ambiguous decode by adding at least a portion of a dot to the respective nominal numbers of dots to produce an increased number of dots;
maintaining unchanged the dark regions of one of the characters having the unambiguous decode; and
printing the widened dark regions and the unchanged dark regions within the symbol by printing the increased number of dots and the nominal number of dots, respectively.

9. The method of claim 8 further comprising the step of, for each number of dots, specifying a binary bit for each dot, the binary bit having a first state corresponding to the printing of the dot and a second state corresponding to the non-printing of the dot, wherein the step of widening at least one of the dark regions of a first one of the characters having the ambiguous decode by adding at least a portion of a dot to the respective nominal numbers of dots to produce an increased number of dots includes the step of changing the state of at least one of the binary bits from the second state to the first state.

10. The method of claim 8 wherein the character symbol set is an EAN/UPC designated set.

11. The method of claim 10 wherein the characters having the ambiguous decode include the "1", "2", "7", and "8" characters.

12. The method of claim 10 wherein the characters having the ambiguous decode include the "1", "2", "7", and "8" characters and wherein the step of widening at least one of the dark regions of a first one of the characters having the ambiguous decode by adding at least a portion of a dot to the respective nominal numbers of dots to produce an increased number of dots includes adding at least a portion of one dot to dark regions of left odd or right odd "1" and "2" characters or of left even or right even "7" and "8" characters.

13. The method of claim 10 further comprising the steps of:
narrowing at least one of the dark regions of a second one of the characters having the ambiguous decode by subtracting at least a portion of a dot from the respective nominal numbers of dots to produce a reduced number of dots; and
printing the narrowed dark regions by printing the reduced number of dots.

14. The method of claim 13 wherein the characters having the ambiguous decode include the "1", "2", "7", and "8" characters and wherein the step of narrowing at least one of the dark regions of a second one of the characters having the ambiguous decode by subtracting at least a portion of a dot from the respective nominal numbers of dots to produce a reduced number of dots includes the step of subtracting at least a portion of one dot from dark regions of left even or right even "1" and "2" characters or to left odd or right odd "7" and "8" characters.

15. A method of printing a symbol in a pre-defined symbology character set, the symbol being formed from a group of characters, each character being represented by a plurality of dark regions and light regions, wherein selected ones of the characters have an ambiguous decode upon edge-to-edge decoding and others of the characters within the symbol have an unambiguous decode upon edge-to-edge decoding, and wherein the ambiguous decoding can be resolved by evaluating a cumulative width of the dark regions, the method comprising the steps of:
segmenting the symbol into a plurality of rows, each row forming a portion of each of a plurality of characters;
designating a data set for each row, the data set including of plurality of bits, each bit having a first state representing a dot and a second state representing an absence of a dot at a corresponding location in one of the portions of the characters;
identifying in the plurality of characters, the characters having the ambiguous decode upon edge-to-edge decoding;
identifying in the plurality of characters, the characters having the unambiguous decode upon edge-to-edge decoding;
adjusting the data sets to produce an adjusted data set for each row of the identified characters in the symbol by:
for selected ones of the identified characters in the symbol having the ambiguous decode, changing the state of at least one of the bits front the first state to the second state;

for each of the identified characters in the symbol having the unambiguous decode, maintaining the bit states unchanged; and combining the changed bits and the unchanged bits to form the adjusted data set; and printing dots according to the adjusted data set.

16. The method of claim 15 wherein the characters having the ambiguous decode include the "1", "2", "7", and "8" characters and wherein the selected ones of the identified characters include left even and right even "1" and "2" characters and left odd and right odd "7" and "8" characters.

17. A method of printing a symbol in a pre-defined symbology character set, the symbol being formed from a group of characters, each character being represented by a plurality of dark regions and light regions, wherein selected ones of the characters have an ambiguous decode upon edge-to-edge decoding and others of the characters in the symbol have an unambiguous decode upon edge-to-edge decoding, and wherein the ambiguous decoding can be resolved by evaluating a cumulative width of the dark regions, the method comprising the steps of:

segmenting the symbol into a plurality of rows, each row forming a portion of each of a plurality of characters;

designating a data set for each row, the data set including of plurality of bits, each bit having a first state representing a dot and a second state representing an absence of a dot at a corresponding location in one of the portions of the characters;

identifying in the plurality of characters, this characters having the ambiguous decode upon edge-to-edge decoding;

identifying in the plurality of characters, the characters having the unambiguous decode upon edge-to-edge decoding;

adjusting the data sets to produce an adjusted data set for each row of the identified characters in the symbol by:

for the identified characters in the symbol having the ambiguous decode, changing the state of at least one of the bits from the second state to the first state;

for each of the identified characters in the symbol having the unambiguous decode, maintaining the bit states unchanged; and combining the changed bits and the unchanged bits to form the adjusted data set; and printing dots according to the adjusted data set.

18. The method of claim 17 wherein the characters having the ambiguous decode include the "1", "2", "7", and "8" characters and wherein the selected ones of the identified characters include left odd or right odd "1" and "2" characters or left even or right even "7" and "8" characters.

19. In a demand printer printing a selected symbol including a pre-defined EAN/UPC symbology character set having "left odd", "left even", "right even", and "right odd" versions as a series of bars separated by spaces in which the bars are formed of horizontal rows of closely adjacent dots by logic designating dots to be printed in the horizontal rows of the bars of the characters, a method for preventing ambiguous decoding of "1", "2", "7", and "8" characters printed by the printer comprising the steps of:

adjusting the pre-defined EAN/UPC symbology character set for the "1", "2", "7", or "8" characters by subtracting at least a portion of one dot or more per horizontal row from bars of left even or right even "1" characters, left even or right even "2" characters, left odd or right odd "7" characters, or left odd or right odd "8" characters within the selected symbol; and retaining unchanged the horizontal row from bars of others of the characters within the selected symbol.

20. The method of claim 19 wherein the step of adjusting the pre-defined EAN/UPC symbology character set for the "1", "2", "7" or "8" characters includes subtracting at least one dot to all of the left even or right even "1" characters, the left even or right even "2" characters, the left odd or right odd "7" characters and the left odd or right odd "8" characters within the selected symbol.

21. In a demand printer printing a selected symbol including a pre-defined EAN/UPC symbology character set having "left odd", "left even", "right even", and "right odd" versions as a series of bars separated by spaces in which the bars are formed of horizontal rows of closely adjacent dots by logic designating dots to be printed in the horizontal rows of the bars of the characters, a method for preventing ambiguous decoding of "1", "2", "7", and "8" characters printed by the printer comprising the steps of:

adjusting the pre-defined EAN/UPC symbology character set for the left odd or right odd "1" characters, the left odd or right odd "2" characters, the left even or right even "7" characters, or the left even or right even "8" characters by adding at least a portion of one dot or more per horizontal row to bars of the left odd or right odd "1" characters, the left odd or right odd "2" characters, the left even or right even "7" characters, or the left even or right even "8" characters within the selected symbol; and retaining unchanged the horizontal row from bars of others of the characters within the selected symbol.

22. The method of claim 21 wherein the step of adjusting the pre-defined EAN/UPC symbology character set for the "1", "2", "7" or "8" characters includes subtracting at least one dot from all of the left even and right even "1" characters, the left even and right even "2" characters, the left odd and right odd "7" characters and the left odd and right odd "8" characters within the selected symbol.

* * * * *

UNITED STATES PATENT AND TRADEMARK OFFICE
CERTIFICATE OF CORRECTION

PATENT NO : 5,890,817
DATED    : April 6, 1999
INVENTOR(S): H. Sprague Ackley

It is certified that error appears in the above-identified patent and that said Letters Patent is hereby corrected as shown below:

Title page, Item [54], and Column 1, line 1, "SYMOLOGY" should be
--SYMBOLOGY--;

Column 8, line 66, "front" should be --from--; and

Column 9, line 29, "this" should be --the--.

Signed and Sealed this

Twenty-seventh Day of February, 2001

*Attest:*

NICHOLAS P. GODICI

*Attesting Officer*   *Acting Director of the United States Patent and Trademark Office*